Feb. 8, 1966  B. RUBIN  3,233,849
AIRCRAFT WHEEL ACCELERATING MEANS

Filed July 13, 1964  3 Sheets-Sheet 1

INVENTOR
Benjamin Rubin

BY Terrell C. Birch
ATTORNEY

Feb. 8, 1966     B. RUBIN     3,233,849
AIRCRAFT WHEEL ACCELERATING MEANS
Filed July 13, 1964     3 Sheets-Sheet 2
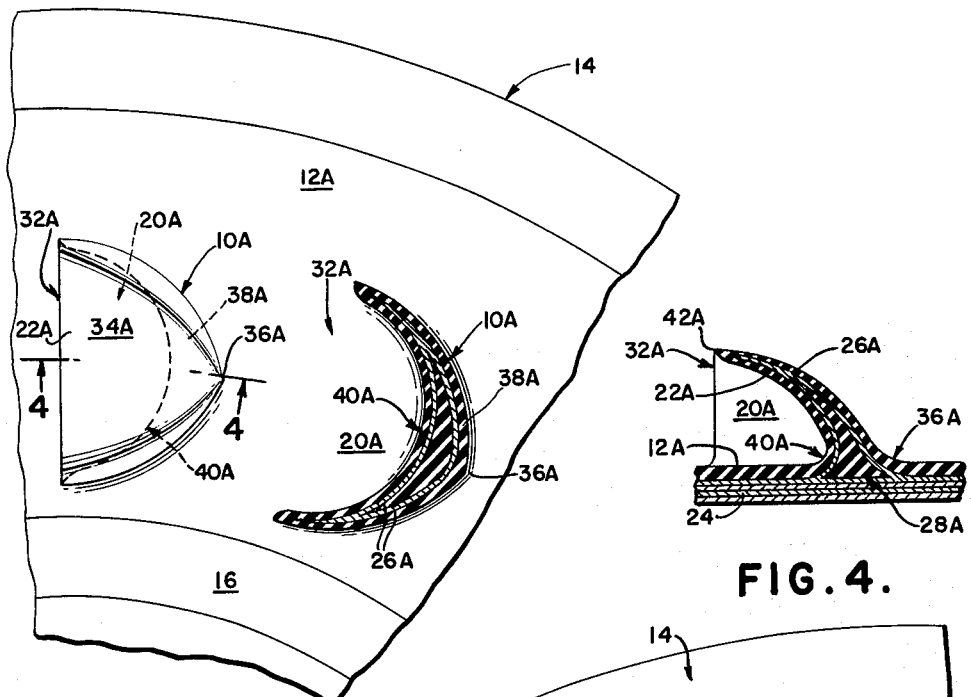
FIG.3.
FIG.4.
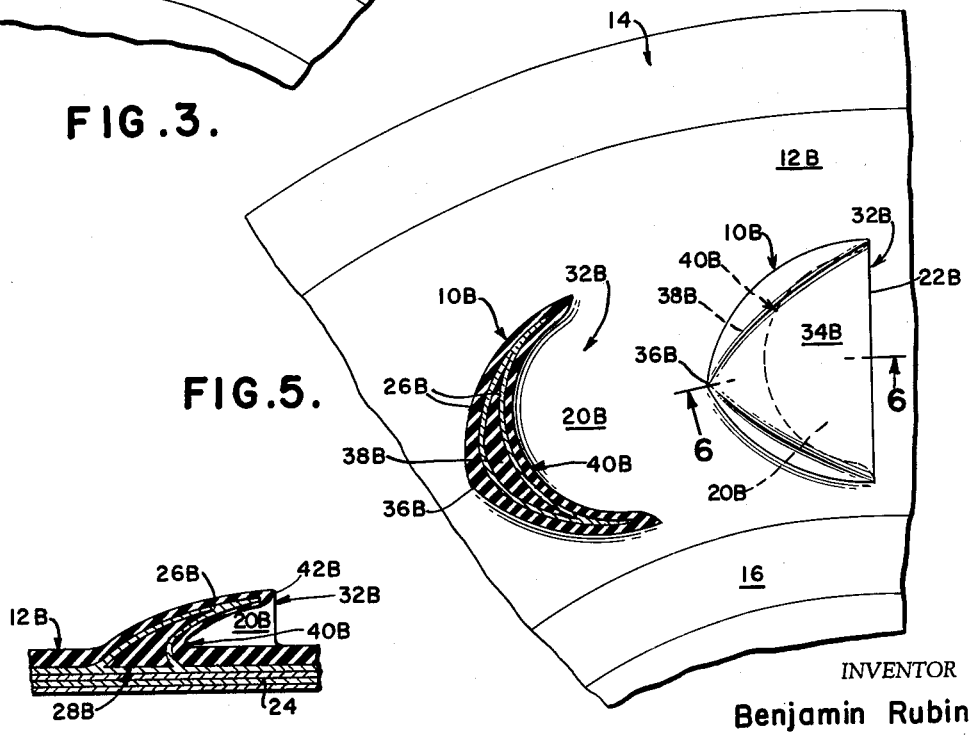
FIG.5.
FIG.6.
INVENTOR
Benjamin Rubin
BY Terrell P. Birch
ATTORNEY INVENTOR
Benjamin Rubin
BY Terrell C. Birch
ATTORNEY United States Patent Office 3,233,849
Patented Feb. 8, 1966

3,233,849
AIRCRAFT WHEEL ACCELERATING MEANS
Benjamin Rubin, Philadelphia, Pa., assignor to B. Rubin Research, Inc., Dover, Del., a corporation of Delaware
Filed July 13, 1964, Ser. No. 382,180
13 Claims. (Cl. 244—103)

This invention relates to means for accelerating the wheels of an aircraft during a landing approach and now particularly, to vane means on the sidewalls of the tires on the aircraft wheels.

Many vane or scupper constructions have been attempted in the past to accelerate aircraft wheels up to a rotational velocity which will be approximately compatible with the ground speed of the aircraft at the point of initial contact thereof with the landing surface. None of the prior art constructions are in use today except, perhaps, in isolated cases. Thus, a problem exists in the art which has never been satisfactorily solved.

It is an object of this invention to provide an air operated passive acceleration means for aircraft wheels which is highly efficient.

It is another object of this invention to provide an air operated passive acceleration means for aircraft wheels which increases heat radiation from the tire carcass.

Another object of this invention is to provide an air operated passive acceleration means for aircraft wheels which is formed as an integral part of the sidewall of the tire carcass.

Still another object of this invention is to provide an air operated passive acceleration means for aircraft wheels which acts to strengthen the carcass of the aircraft tire.

Yet another object of this invention is to provide an air operated passive acceleration means for aircraft wheels comprising a plurality of air vanes or scuppers juxtoposed with the sidewalls of the aircraft tires and having a novel shape and interconnection with the said tires.

Yet another object of this invention is to provide an air operated passive acceleration means for aircraft wheels comprising a plurality of air vanes or scuppers integrally formed on the sidewalls of the aircraft tires and having a novel shape and means of interconnection with the carcass of the said tires.

These and other objects of this invention will become more fully apparent with reference to the following specification and drawings which relate to some preferred embodiments of the invention.

In the drawings:

FIGURE 3 is an enlarged detail in partial cross-section of FIGURE 1;

FIGURE 4 is a cross-section taken along line 4—4 of FIGURE 3;

FIGURE 5 is an enlarged detail in partial cross-section of the back side of FIGURE 1;

FIGURE 6 is a cross-section taken along line 6—6 of FIGURE 5;

Figure 1:
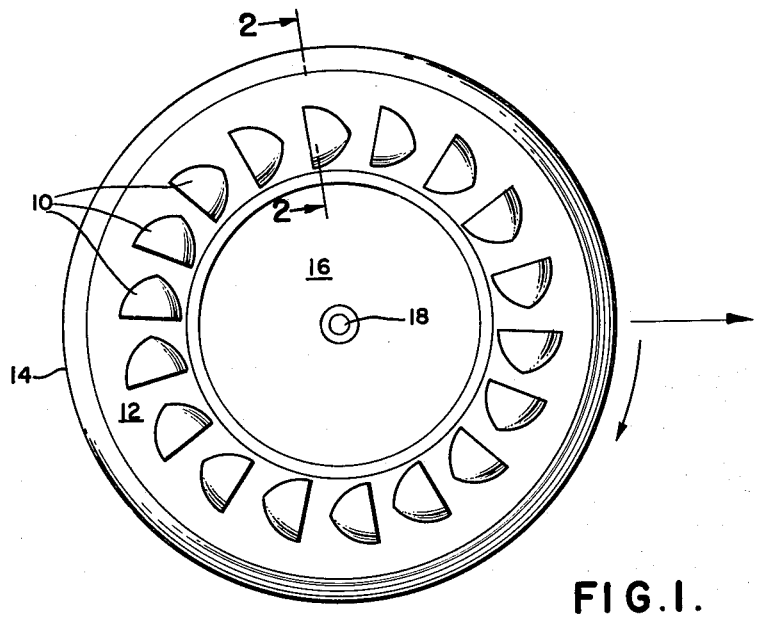
FIGURE 1 is a side elevation of an aircraft wheel and tire including the present invention.
Figure 2:
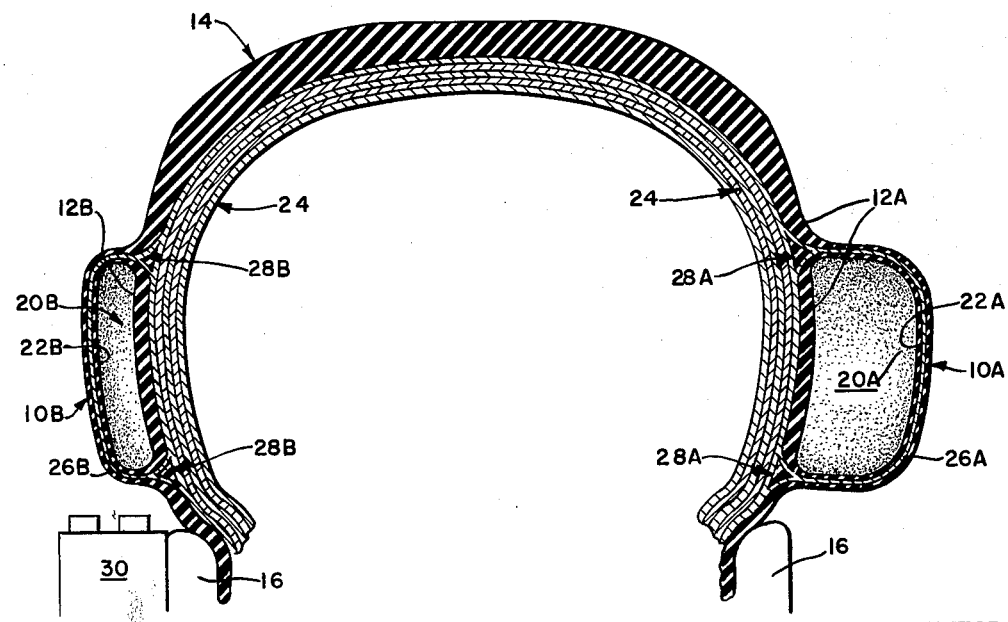
FIGURE 2 is a cross-section taken along line 2—2 of FIGURE 1.

Referring in detail to the drawings and more particularly to FIGURES 1 and 2, the invention is shown as generally comprising a plurality of air vanes, scoops or scuppers 10 integrally attached to the sidewall 12 of a tire 14 which is mounted on a wheel 16, the said wheel being rotatable about an axis 18.

As specifically shown in FIGURE 2, the tire 14 is provided with a first set of scoops 10A on one sidewall 12A and a second set of scoops 10B on the other sidewall 12B.

The first scoops 10A have a cavity 20A therein which has an outer defining wall 22A having a larger radius of curvature than the sidewall 12A of the tire 14, making the cavity 20A substantially flat on one side in cross-section.

The tire 14 is provided with numerous plies 24 of tire cord fabric or the like. The scoop 10A is provided with one or more reinforcing plies 26A of similar cord fabric which extend completely around the cavity 20A and interlock with the tire cord fabric 24 in an area 28A generally defined by the configuration of the intersection of the first scoops 10A with the sidewall 12A of the tire 14.

The cavities 20A of first scoops 10A are made substantially larger in cross-section than the cavities 20B in the second scoops 10B. This is because of the structural characteristics or present day landing gear which places space limitations on the scoops 10A and 10B because of outer and inner strut structures, respectively, not shown, as well as the presence of a brake drum 30 on the inner side of the wheel 16. Thus, the first scoops 10A are external or faced outward from the center line of an aircraft on which they are used on the main landing gear and the second scoops 10B are internal or faced inward towards the said center line. Of course, if used on a nose wheel which is not braked and is symmetrically disposed in the supporting struts, both sets of the scoops 10A and 10B could be identical.

The construction of the second scoops 10B is identical with that of the scoops 10A with the same numerals bearing the suffix B on the drawings. The difference is a dimensional reduction both in the length and the width of the cross-section 20B from the cross-section 20A.

Referring now to FIGURE 3, the first scoops 10A are shown in top plan view as having a tear-drop configuration trailing the mouth portion 32A of the cavity 20A. Because of the larger radius of curvature of the outer wall 22A of the cavity 20A, a generally triangular projection 34A is effected on the exterior of the wall 22A having an apex 36A common with the apex of the tear-drop.

The cavity 20A is shaped to have a substantially semi-circular shape in top plan view by providing a thickened reinforcing portion 38A in the trailing end of the scoop 10A. The reinforcing portion 38A provides added strength and operational rigidity to the scoops 10A.

In vertical front-to-back cross-section, as shown in FIGURE 4, the cavity 20A is contoured at its line of intersection 40A with the sidewall 12A of the tire 14 such there is provided a smooth and gradual transition from the said sidewall 12A to the outer wall 22A of the cavity 20A.

The inner surface of the outer cavity wall 22A is thus provided with a radius of curvature varied from the mouth 32A to the line of intersection 40A which radius decreases at a greater rate than the varying radius of the outer surface thereof.

This cavity configuration provides an efficient self-scavenging action of the scoops 10A as will be hereinafter more fully described.

Referring further to FIGURE 4, the leading edge 42A of the scoop 10A which defines the mouth portion 32A thereof is bevelled outward from within the cavity 20A whereby, as will be hereinafter more fully described, all sides of the scoop 10A tend to plane outward and provide a maximum open condition of the mouth portion 32A.

By now referring to FIGURES 5 and 6, which are synonymous, respectively, to FIGURES 3 and 4, the second scoops 10B are identically described as the first scoops 10A, the suffix B being affixed to like numerals on the drawings.

Figures 7, 8:
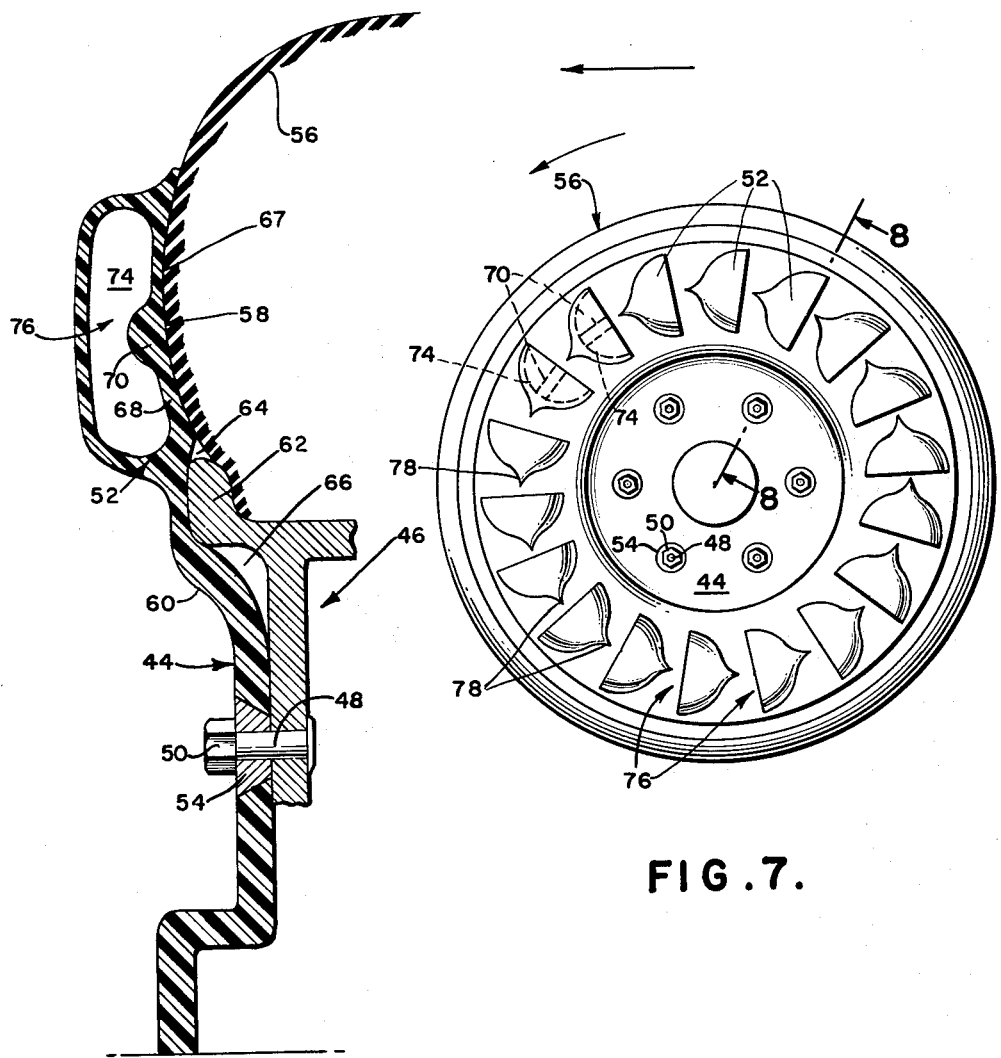
FIGURE 7 is a side elevation of another embodiment of the invention.
FIGURE 8 is an enlarged partial cross-section taken along line 8—8 of FIGURE 7.

Referring now to FIGURES 7 and 8, another embodiment of the invention is shown as generally comprising a hub-cap 44 removably secured to an aircraft wheel 46 by means of lug nuts 48 and bolts 50, the hub-cap 44 carrying a plurality of air scoops 52 aligned about the said hub-cap on a predetermined radius. The nuts 50 seat on metallic reinforcing inserts 54 set in the hub-cap 44 which is preferably made of bonded fiberglass material.

A tire 56 is mounted on the wheel 46 and includes sidewalls 58. The scoops 52 are so positioned on the hub-cap 44 that they are on the same radius as the sidewalls 58.

The hub-cap 44 is adapted to flex inwardly of the side face of the wheel upon tightening of the nuts 50 and is provided with a gradually stepped portion 60 which overlies the flange or rim 62 of the wheel 46. The gradual contour of the stepped portion leaves air spaces 64 and 66, respectively, about and below the rim 62 between the hub-cap 44 and sidewall 58 and between the hub-cap 44 and the wheel 46.

The annular portion 67 of the hub-cap 44 which contains the scoops 52 has a radius of curvature on its inside surface which is substantially identical with that of the sidewall 58 of the tire 56, whereby the annular portion 67 is fully juxtaposed with the said sidewall 58.

Longitudinally of each of the scoops 52 and located on the sidewall side 68 thereof is a raised integral rib 70 which serves to reinforce the hub-cap 44 throughout the annular portion 67 in the arcuate segments thereof coincident with the scoops 52.

The internal cavity 72 of the scoops 52 is shaped internally to have a substantially semi-circular line of contact 74 with the outer surface of the annular portion 67, a smooth transition being effected between the said line of contact 74 and the said surface of the annular portion in a manner similar to that disclosed for the embodiments of FIGURES 1 through 6. The open mouth 76 of the scoops 52 is also similar to the foregoing embodiments.

The scoops 52 are of the same general exterior shape of the first and second scoops 10A and 10B of the foregoing embodiments with the exception that the apex 78 of the said scoops 52 is further extended and comprises an integral part of the reinforcing rib 70. Thus, the scoops 52 are made very rigid and lend additional stiffness to the annular portion 66 of the hub-cap 44, the scoop 52 being integrally molded with and of the same material as the hub-cap 44.

In all of the foregoing embodiments, the scoops 10A, 10B and 52, respectively, are all aligned on a circumferential path of substantially the same radii with the open mouth portions 32A, 32B and 76, respectively, all facing substantially forward with respect to the direction of translation when they are below the axis of rotation of the aircraft wheels. Thus, those scoops located above the axis of rotation have their apices 36A, 36B and 78, respectively, facing substantially in the direction of translation.

*Operation*

In operation, referring first to FIGURES 1 through 6, the arrows in FIGURE 1 indicate the directions of translation and rotation of the wheel 16.

In flight, the velocity of the air moving relative to the wheel 16 in the opposite direction will be engaged by the open mouth portions 32A and 32B of the air scoops 10A and 10B, respectively, below the axis of rotation 18 of the wheel 16 and the resulting force exerted on the said scoops by the said air will impart rotation to the wheel 16 and tire 14.

As the wheel 16 rotates, the scoops 10A and 10B are gradually reversed with respect to the direction of relative velocity between the wheel 16 and the airstream in which it is moving. This gradual reversal of attitude of the first and second sets of the scoops 10A and 10B combines with the smooth transitional contours of the scoop cavities 20A and 20B, respectively, to effect a complete scavenging action of the scoops.

As the scoops 10A and 10B pass over the top of their arc of travel, the attitude thereof is once more gradually reversed such that the open mouth portions 32A and 32B thereof, respectively, are presented to the air stream in such a manner as to gradually increase the rotational effect or thrust exerted on the wheel 16 by each of the said scoops. By virtue of this gradual presentation of the said mouth portions and the smooth transitional surfaces of the scoop cavities 20A and 20B, the scoops 10A and 10B are completely filled with air under pressure and vacuums or voids are thereby obviated to effect the maximum thrust against the internal effective area of the said cavities.

As the air stream enters the respective mouth portions 32A and 32B of the scoops 10A and 10B, the respective beveled lip portions 42A and 42B plane outward under the action of the resultant forces imposed on the said beveled lips by the airstream and thereby assure a completely open condition for each of the said scoops during the thrust portion of the operating cycle thereof. The maximum opening of the scoops 10A and 10B is limited by the reinforcing webs 26A and 26B, respectively, which thus prevent detrimental contact of the said scoops with the struts or other component parts of the landing gear of an aircraft on which the subject invention is utilized.

By incorporating a set of air scoops of the present invention on both sides of the tire 14, the thrust exerted on the wheel bearings is properly distributed and wheel balance is maintained. In addition the effective area of the scoops is materially increased.

Referring now to FIGURES 7 and 8, a pair of the hub-caps 44 are affixed one on either side of the wheel 46 via the lug nuts 50 and studs 48. Since the internal shape of the cavities 76 in the scoops 52 are substantially identical with the shapes of the cavities 20A in the embodiment of FIGURES 1, 2, 3 and 4, the same action of the airstream occurs, as in FIGURES 1 through 6, in accelerating the tire 56 and wheel 46 in the direction shown by the arrows in FIGURE 7. Thus, the operation of the embodiment of FIGURES 7 and 8 has been substantially described above with reference to the embodiment of FIGURES 1 through 6.

As can be seen from the foregoing specification and drawings, this invention satisfies a long felt need in the art for an efficient, practical and strong passive wheel accelerating structure for aircraft wheels, whereby present day high-speed aircraft and future ultra-high speed aircraft having supersonic airspeeds will be able to effect a great number of landings on the same set of tires and at the same time place almost negligible stress on the tire carcasses due to ground accelerations of the wheels at the time of initial engagement of the tires with the runway. In addition, the present invention provides a structure which is readily incorporated in present day aircraft without any modification to the landing gear structures thereof and which both strengthens and improves the heat dissipating characteristics of aircraft tires.

Further, because of the high rotational velocities of the aircraft wheels achieved by the present invention, the aircraft wheels act as gyroscopic means with sufficient inertia to impose a stabilizing action on an aircraft incorporating the present invention during a landing approach, thereby assisting the pilot in maintaining the aircraft on a true landing course.

The above-described gyroscopic action enhances control of the aircraft on the ground in the vent of the occurrence of a tire deflation during a landing, by opposing the forces set up during such a condition which tend to induce yaw in the aircraft.

It is to be understood that the embodiments of this invention shown and described herein are for the purpose of example only and are not intended to limit the scope of the appended claims.

What is claimed is:

1. Means for accelerating the wheels of an aircraft by the action of the airstream flowing thereby, said wheels having tires mounted thereon, comprising a plurality of air scoops positioned about said tire on the sidewalls thereof at a predetermined radius from the axis of rotation thereof, said scoops being of substantially the same material as the tire and comprising an open end outstanding from said sidewalls and a closed end substantially flush with said sidewalls, said open end facing in a wind catching direction below the said axis of rotation of said tire in the forward direction of said aircraft, a streamlined external contour extending from said open end to an apex forming said closed end, said apex being flush with said sidewalls, said external contour having a majority of its outer surface comprising a curved plane spaced from and overlying the contour of said sidewalls with a radius of curvature substantially greater than that of said sidewalls, an internal cavity extending from said open end to a point substantially short of said apex, said cavity having substantially a semi-circular line of contact with said sidewalls internally of each of said scoops, said curved plane having a smooth transitional curve from said open end to said apex and said internal cavity having a defining wall partially coextensive with said curved plane, said wall having a smooth transitional curve with a greater rate of curvature than that of said curved plane and blending smoothly with said sidewalls at said line contact, and reinforcing means intermediate said curved plane and said defining wall and coextensive therewith extending through said sidewalls and into the carcass of said tire.

2. The invention defined in claim 1, wherein said carcass comprises laminated fabric wherein said reinforcing means comprises fabric mesh interlocked with the fabric of said carcass.

3. The invention defined in claim 1, wherein said fabric mesh comprises first and second fabric layers converging at said open end of said scoop and diverging at the closed end thereof.

4. The invention defined in claim 1, wherein said scoops comprise resilient material limited in extendability by said reinforcing means and further wherein said open end of said scoops includes an internally bevelled rim portion adapted to plane outwardly under the influence of said airstream.

5. Means for accelerating the wheels of aircraft by the action of the airstream flowing thereby, said wheels having tires mounted thereon, comprising a plurality of air scoops positioned about said tire at the sidewalls thereof at a predetermined radius from the axis of rotation thereof, said scoops each having an open end outstanding from said sidewalls and a closed end substantially flush with said sidewalls, said open end facing in a wind catching direction below the said axis of rotation of said tire in the forward direction of said aircraft, a streamlined external contour extending from said open end to an apex forming said closed end, said external contour having a majority of its outer surface comprising a curved plane spaced from and overlying the contour of said sidewalls with a radius of curvature substantially greater than that of said sidewalls, an internal cavity extending from said open end to a point substantially short of said apex, said cavity having a substantially semi-circular projection on said sidewalls internally of each of said scoops, said curved plane having a smooth transitional curve from said open end to said apex and said internal cavity having a defining wall partially coextensive with said curved plane, said wall having a smooth transitional curve with a greater rate of curvature than that of said curved plane and blending smoothly into the semi-circular shape of the said cavity.

6. The invention defined in claim 5, wherein said means further comprises a hub-cap integrally formed with and of the same material as said scoops, said hub-cap being affixed to said aircraft wheel, coextensive with said wheel and substantially coextensive with the said sidewalls of said tire, said scoops being mounted on one face of said hub-cap.

7. The invention defined in claim 6, wherein said hub-cap and said scoops are fabricated of an elastic material which is bowed outward at the center of said one face and adapted to be affixed to said wheel through said center of said one face, whereby said scoops and said hub-cap are biased against said sidewall of said tire.

8. The invention defined in claim 7, wherein said elastic material comprises bonded fiber-glass.

9. The invention defined in claim 6, wherein said hub-cap further includes an integral raised rib extending internally of said scoop from one end to the other thereof.

10. A self-accelerating aircraft tire comprising a reinforced fabric carcass, a tread portion on said carcass, sidewalls adjacent said tread portion on said carcass, and a plurality of air scoops integral with said sidewalls and said carcass, each of said scoops being of substantially the same material as said tire and comprising an open end outstanding from one of said sidewalls and a closed end substantially flush with said one of said sidewalls, said open end facing in a wind catching direction below axis of rotation of said tire in the direction in which said tire is adapted to translate, a streamlined external contour extending from said open end to an apex forming said closed end, said apex being flush with said one of said sidewalls, said external contour having a majority of its outer surface comprising a curved plane spaced from and overlying the contour of said one of said sidewalls with a radius of curvature substantially greater than that of said one of said sidewalls, an internal cavity extending from said open end to a point substantially short of said apex, said cavity having substantially a semi-circular line of contact with said one of said sidewalls internally of each of said scoops, said curved plane having a smooth transitional curve from said open end to said apex and said internal cavity having a defining wall partially coextensive with said curved plane, said wall having a smooth transitional curve with a greater rate of curvature than that of said curved plane and blending smoothly with said one of said sidewalls at said line contact, and reinforcing means intermediate said curved plane and said defining wall and coextensive therewith extending through said one of said sidewalls and into the carcass of said tire.

11. The invention defined in claim 10, wherein said carcass comprises laminated fabric wherein said reinforcing means comprises fabric mesh interlocked with the fabric of said carcass.

12. The invention defined in claim 11, wherein said fabric mesh comprises first and second fabric layers converging at said open end of said scoop and diverging at the closed end thereof.

13. The invention defined in claim 10, wherein said scoops comprise resilient material limited in extendability by said reinforcing means and further wherein said open end of said scoops includes an internally beveled rim portion adapted to plane outwardly under the influence of said airstream.

References Cited by the Examiner
UNITED STATES PATENTS

| | | | |
|---|---|---|---|
| 2,383,662 | 8/1945 | McClaskey | 244—103 |
| 3,178,135 | 4/1965 | Moore | 244—103 |

ARTHUR L. LA POINT, *Primary Examiner.*

C. W. HAEFELE, *Assistant Examiner.*